(12) United States Patent
Hu

(10) Patent No.: US 8,370,063 B2
(45) Date of Patent: Feb. 5, 2013

(54) NAVIGATION SYSTEM HAVING FILTERING MECHANISM AND METHOD OF OPERATION THEREOF

(75) Inventor: Jinsong Hu, San Jose, CA (US)

(73) Assignee: Telenav, Inc., Sunnyvale, CA (US)

( * ) Notice: Subject to any disclaimer, the term of this patent is extended or adjusted under 35 U.S.C. 154(b) by 637 days.

(21) Appl. No.: 12/260,993

(22) Filed: Oct. 29, 2008

(65) Prior Publication Data

US 2010/0106405 A1 Apr. 29, 2010

(51) Int. Cl.
*G01C 21/10* (2006.01)

(52) U.S. Cl. ...................................... 701/479

(58) Field of Classification Search .......... 701/200, 701/206, 207, 208, 479; 455/456.1; 342/357.4
See application file for complete search history.

(56) References Cited

U.S. PATENT DOCUMENTS

| | | | |
|---|---|---|---|
| 5,732,387 A | 3/1998 | Armbruster et al. | |
| 5,974,356 A | 10/1999 | Doyle et al. | |
| 6,239,742 B1* | 5/2001 | Krasner | 342/357.4 |
| 6,519,464 B1* | 2/2003 | Santhoff et al. | 455/456.5 |
| 7,164,986 B2 | 1/2007 | Humphries et al. | |
| 7,317,927 B2 | 1/2008 | Staton et al. | |
| 7,323,982 B2 | 1/2008 | Staton et al. | |
| 7,327,250 B2 | 2/2008 | Harvey | |
| 7,327,258 B2 | 2/2008 | Fast et al. | |
| 7,339,469 B2 | 3/2008 | Braun | |
| 7,379,805 B2 | 5/2008 | Olsen, III et al. | |
| 7,606,288 B2* | 10/2009 | Prestwich et al. | 375/130 |
| 2002/0098851 A1* | 7/2002 | Walczak et al. | 455/456 |
| 2002/0167441 A1* | 11/2002 | McBurney et al. | 342/357.03 |
| 2002/0183069 A1* | 12/2002 | Myr | 455/456 |
| 2003/0134647 A1* | 7/2003 | Santhoff et al. | 455/456 |
| 2006/0197672 A1 | 9/2006 | Talamas, Jr. et al. | |
| 2007/0030841 A1* | 2/2007 | Lee et al. | 370/352 |
| 2007/0161380 A1* | 7/2007 | Fok et al. | 455/456.1 |
| 2008/0125964 A1* | 5/2008 | Carani et al. | 701/207 |
| 2008/0158059 A1* | 7/2008 | Bull et al. | 342/387 |
| 2008/0161014 A1* | 7/2008 | Monnerat | 455/456.1 |
| 2009/0177382 A1* | 7/2009 | Alles et al. | 701/208 |

FOREIGN PATENT DOCUMENTS

WO 2006130515 A2 12/2006

OTHER PUBLICATIONS

International Search Report for PCT/US2009/062099.

* cited by examiner

*Primary Examiner* — Mary Cheung
*Assistant Examiner* — Truc M Do (57) ABSTRACT

A method of operation of a navigation system includes sampling a first location reading from a device; sampling a first time stamp associated with the first location reading; sampling a second location reading from the device; sampling a second time stamp associated with the second location reading; obtaining a velocity for the device between the first location reading and the second location reading; and validating the second location reading with the first location reading, the first time stamp, the second time stamp, and the velocity for displaying on the device.

20 Claims, 8 Drawing Sheets

NAVIGATION SYSTEM HAVING FILTERING MECHANISM AND METHOD OF OPERATION THEREOF

TECHNICAL FIELD

The present invention relates generally to a navigation system, and more particularly to a navigation system having a filter mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Numerous technologies have been developed to utilize this new functionality. Some of the research and development strategies focus on new technologies while others focus on improving the existing and mature technologies. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning service (GPS) navigation system for a car or on a mobile device such as a cell-phone or personal digital assistant (PDA). However, location reading systems can have inaccuracies that can impair a navigation system.

Thus, a need remains for a navigation system to efficiently filter erroneous location readings, to enable reliable location based services, and to provide more accurate routing guidance. In view of the ever-increasing added features desired by consumers in their mobile devices, it is more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including sampling a first location reading from a device; sampling a first time stamp associated with the first location reading; sampling a second location reading from the device; sampling a second time stamp associated with the second location reading; obtaining a velocity for the device between the first location reading and the second location reading; and validating the second location reading with the first location reading, the first time stamp, the second time stamp, and the velocity for displaying on the device.

The present invention provides a navigation system including a location unit for sampling a first location reading from a device, sampling a first time stamp associated with the first location reading, sampling a second location reading from the device, and sampling a second time stamp associated with the second location reading; and a control unit coupled to the location unit for obtaining a velocity for the device between the first location reading and the second location reading, and validating the second location reading with the first location reading, the first time stamp, the second time stamp, and the velocity for displaying on the device.

Certain embodiments of the invention have other aspects in addition to or in place of those mentioned above. The aspects can become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it can be apparent that the invention can be practiced without these specific details. In order to avoid obscuring the present invention, some well-known circuits, system configurations, and process locations are not disclosed in detail.

Likewise, the drawings showing embodiments of the system are semi-diagrammatic and not to scale and, particularly, some of the dimensions are for the clarity of presentation and are shown greatly exaggerated in the drawing FIGs.

One skilled in the art would appreciate that the format with which navigation information is expressed is not critical to some embodiments of the invention. For example, in some embodiments, navigation information is presented in the format of (x, y), where x and y are two ordinates that define the geographic location, i.e., a position of a user.

In an alternative embodiment, navigation information is presented by longitude and latitude related information. In a further embodiment of the present invention, the navigation information also includes a velocity element comprising a speed component and a direction component.

The term "navigation routing information" referred to herein is defined as the routing information described as well as information relating to points of interest to the user, such as local business, hours of businesses, types of businesses, advertised specials, traffic information, maps, local events, and nearby community or personal information.

The term "block" referred to herein can include software, hardware, or a combination thereof. For example, the software can be machine code, firmware, embedded code, and application software. Also for example, the hardware can be circuitry, processor, computer, integrated circuit, integrated circuit cores, or a combination thereof.

Figure 1:
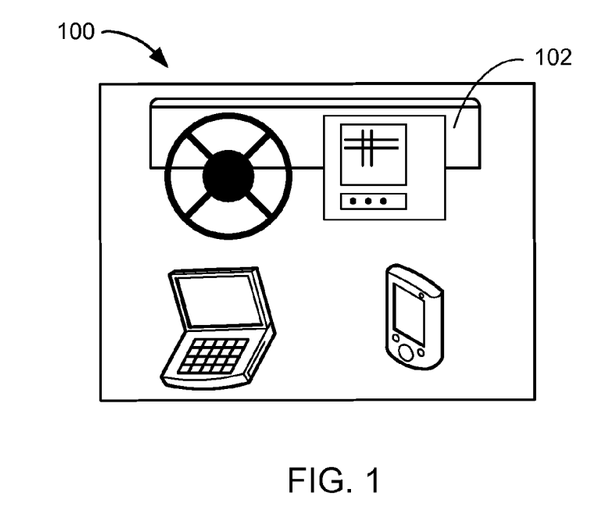
FIG. 1 illustrates a navigation system in a first embodiment of the present invention.

Referring now to FIG. 1, therein is shown a navigation system 100 in a first embodiment of the present invention. As will be described in more details later, the navigation system 100 validates location readings and filters out errant location readings for providing a more accurate, reliable, and robust navigation system.

The navigation system 100 can include a device 102 such as a cellular phone, personal digital assistant, a notebook computer, or other multi-functional mobile communication or entertainment devices. The device 102 can be a standalone device, or can be incorporated with a vehicle, for example a car, truck, bus, train, or other. For example, the display of the device 102 can be an in-dash display on the vehicle. The device 102 also has means for location monitoring, such as a global positioning system (GPS) function.

Figure 2:
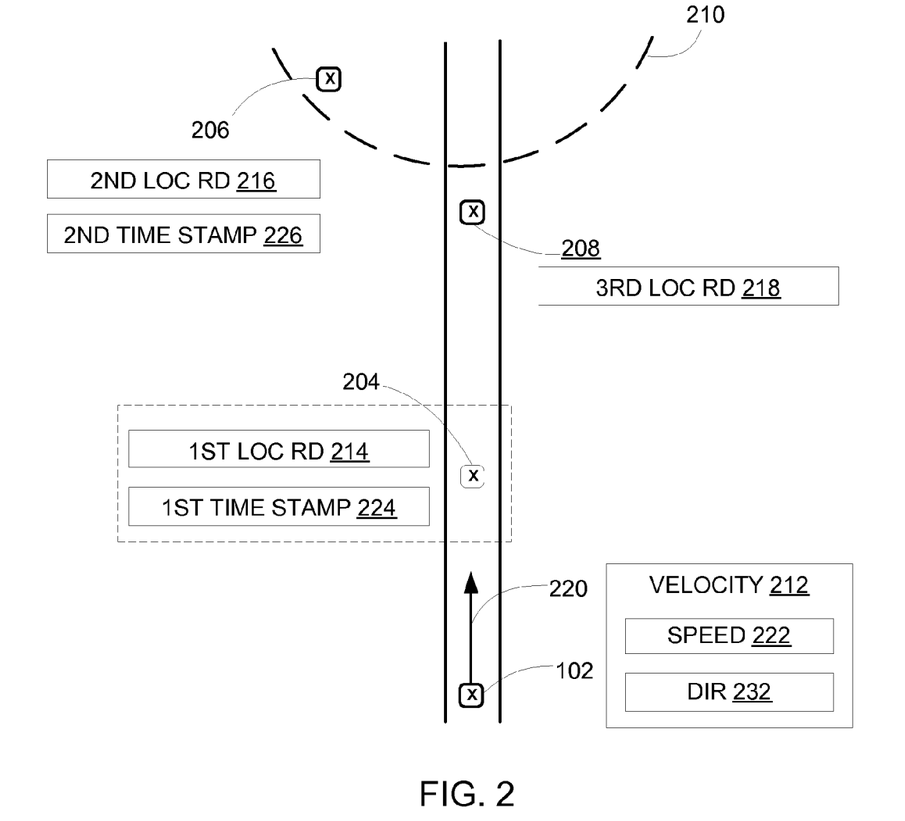
FIG. 2 is a geographic view of an application of the navigation system of FIG. 1.

Referring now to FIG. 2, therein is shown a geographic view of an application of the navigation system 100 of FIG. 1. The geographic view depicts the device 102 traversing a route 220. The route 220 is depicted by the arrow, as an example. The geographic view also depicts a navigation boundary 210, such as a geo-fence, intersecting the route 220.

The navigation boundary 210 is defined as a geographic region typically determined by a location positioning mechanism, such as GPS. The navigation boundary 210 can be used to initiate location based services whether the device 102 is within or outside the navigation boundary 210. A dotted arch depicts the navigation boundary 210.

For illustrative purposes, the navigation system 100 shows the navigation boundary 210 in a shape of an arch, although it is understood that the navigation system 100 can have the navigation boundary 210 in a different shape. For example, the navigation boundary 210 can be configured in a rectangular shape or a polygon shape.

Also for illustrative purposes, the navigation system 100 is described with the route 220 that is linear or straight, although it is understood that the navigation system 100 can operate with the route 220 with a different configuration. For example, the navigation system 100 can operate with the route 220 having curved portions or having multiple speed zones.

At a first location 204 along the route 220, the device 102 can sample a first location reading 214 and a first time stamp 224. The first location reading 214 and the first time stamp 224 are associated with each other and when the device 102 is at the first location 204. This association is depicted by a dotted rectangle around the first location 204.

The device 102 can travel at a velocity 212 beyond the first location 204 along the route 220. The velocity 212 of the device 102 can include a speed 222 and a direction 232 of the device 102, and can be computed in a number of ways. For example, the velocity 212 can be associated with the first time stamp 224 or it can be an average of velocities across a series of two or more time stamps.

The device 102 can sample both a second location reading 216 and a second time stamp 226 associated with a second location 206. The second location reading 216 can be an errant location reading that is not along the route 220. For example, the second location reading 216 can depict the device 102 in the navigation boundary 210, off the route 220, or a combination thereof.

The device 102 actual correct location is a third location reading 218 for a third location 208 along the route 220. The third location reading 218 for the third location 208 should have been the correct location reading at the second time stamp 226. As depicted, the third location 208 is outside the navigation boundary 210.

The second location reading 216 as an errant location reading can have negative effects on the navigation system 100. For example, the navigation system 100 can provide incorrect routing information to the device 102 based on the second location reading 216 instead of the third location reading 218 that is the correct location reading.

Figure 3:
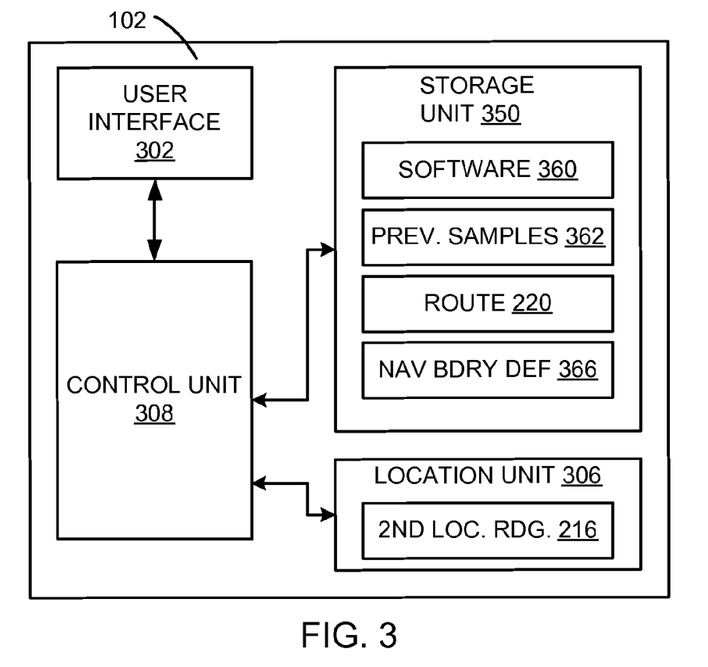
FIG. 3 is a block diagram of the device of FIG. 1.

Referring now to FIG. 3, therein is shown the block diagram of the device 102 of FIG. 1. The device 102 can include a user interface 302, a storage unit 350, a location unit 306, and a control unit 308, such as a processor.

The user interface 302 can include an output mean and an input device. For example, the output device can include a projector, a video screen, a speaker, or any combination thereof. Examples of the input device are a key pad, a touchpad, soft-keys, a keyboard, a microphone, or any combination thereof to provide data and command inputs.

The control unit 308 can execute software 360 and provide the intelligence of the device 102. The control unit 308 can operate the user interface 302 to display information generated by the navigation system 100 of FIG. 1. The control unit 308 can also execute the software 360 for the other functions of the navigation system 100, including receiving location information from the location unit 306. The control unit 308 can obtain the velocity 212 of FIG. 2 based on the first location reading 214 of FIG. 2, the first time stamp 224 of FIG. 2, the second location reading 216 of FIG. 2, and the second time stamp 226 of FIG. 2.

The location unit 306 of the device 102 can read the current location of the device 102 in the second location reading 216 of FIG. 2. The location unit 306 can be implemented in many ways. For example, the location unit 306 can be a global positioning system (GPS), inertial navigation system, cell-tower location system, accelerometer location system, or any combination thereof.

The storage unit 350 can be implemented in a number of ways. For example, the storage unit 350 can be a volatile memory, a nonvolatile memory, an internal memory, an external memory, or a combination thereof.

The storage unit 350 can store the software 360, setup data, and other data for the operation of the device 102 with the navigation system 100. The storage unit 350 can also store the relevant information, such as maps, advertisements, point of interest (POI), navigation routing entries, or any combination thereof. For example, the storage unit 350 can include the route 220 of FIG. 2.

The storage unit 350 can also include previous samples 362, which can include a history of the previous locations of the device 102, sampled by the location unit 306. For example, the previous samples 362 can include the first location reading 214 of FIG. 2, the first time stamp 224 of FIG. 2, as well as earlier location readings and time stamps, etc. The storage unit 350 can also include navigation boundary definitions 366, which can include a description of navigation boundaries such as the navigation boundary 210 of FIG. 2. The control unit 308 can operate on the data of the storage unit 350 to execute the functions of the navigation system 100.

Figure 4:
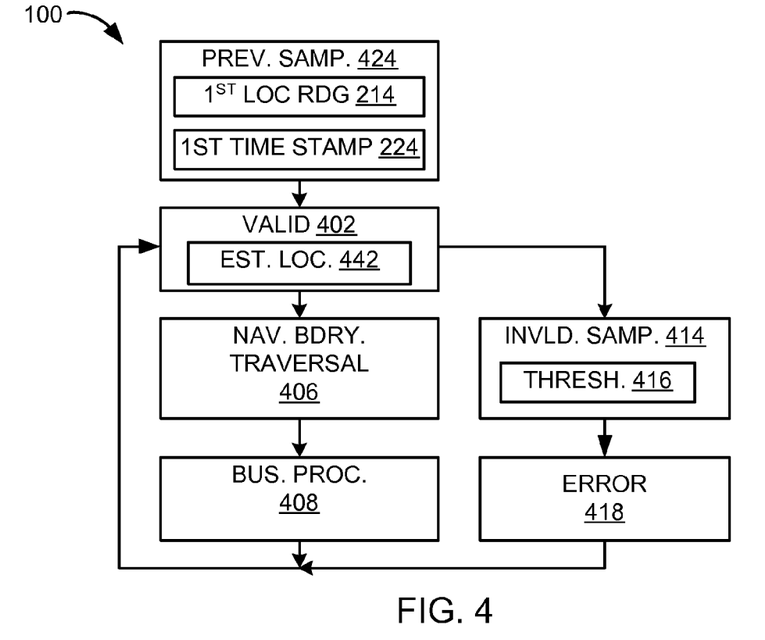
FIG. 4 is a flow chart of the navigation system of FIG. 1.

Referring now to FIG. 4, therein is shown a flow chart of the navigation system 100 of FIG. 1. The navigation system 100 can filter errant location readings including validating a location reading, determining traversal of the navigation boundary 210 of FIG. 2 or a combination thereof. The flow chart of the navigation system 100 can be executed in the control unit 308 of FIG. 2.

A previous sample block 424 of the device 102 can retrieve location readings and their respective associated time stamps from the previous samples 362 of FIG. 3. For example, the previous samples 362 can include the first location reading 214 of FIG. 2 and the first time stamp 224 of FIG. 2.

A valid block 402 can validate a most recent location reading and associated time stamp. The valid block 402 can receive the second location reading 216 of FIG. 2 and the second time stamp 226 of FIG. 2 from the location unit 306 of FIG. 3. The valid block 402 can also receive the first location reading 214 and the first time stamp 224 from the previous sample block 424.

The valid block 402 can compare the second location reading 216, representing the most recent location reading, with an estimated location 442, and decide whether the second location reading 216 is valid. The valid block 402 can calculate the estimated location 442 using the first time stamp 224 and the first location reading 214 from the previous sample block 424, and the velocity 212 of FIG. 2 of the device 102.

If the valid block 402 determines that the second location reading 216 is valid, then a navigation boundary traversal block 406 can determine whether the device 102 has traversed the navigation boundary 210 of FIG. 2. For the purpose of any embodiment of the present invention, traversal is defined as a change in position relative to the navigation boundary 210. For example, either entering or exiting the navigation boundary 210 is considered traversing the navigation boundary 210. The valid block 402 can also add the second location reading 216 to the previous samples 362 for validation of later location readings received from the location unit 306.

The first location reading 214 and the second location reading 216 can be received by the navigation boundary traversal block 406. The navigation boundary traversal block 406 can also receive or contain one or more navigation boundaries from the navigation boundary definitions 366 of FIG. 3. The navigation boundary traversal block 406 can determine from the first location reading 214 and the second location reading 216 whether the device 102 has traversed the navigation boundary 210 or any other navigation boundaries in the navigation boundary definitions 366.

If the navigation boundary traversal block 406 determines that the device 102 has crossed the navigation boundary 210, then the navigation system 100 can operate a business processes block 408. The business processes block 408 can operate a variety of operations such as display advertisements, display coupons, or initiate predetermined billing routines on the user interface 302 of the device 102. It can also display an alert signal on the user interface 302 of the device 102.

If the valid block 402 determines that the second location reading 216 is invalid, the navigation system 100 can decide to disregard or ignore the second location reading 216. For example, a geographic area might have a high rate of invalid location readings. For the purpose of any embodiment of the present invention, a high rate of invalid location readings means that navigation devices in a geographic area can have a higher rate of invalid location readings than in other geographic areas. For example, geographic features of an area such as mountains can interfere with the accuracy of location readings.

The previous sample block 424 can provide this persistent errant location reading flag or designation, or it may be provided by another block or function. For example, the valid block 402 can read the location history of other devices stored in the previous sample block 424 or receive alerts from other devices (not shown) about the errant readings.

The valid block 402 can use the location history or the alerts to decide whether to disregard location readings in a predetermined geographic area prone to errant readings, and wait for a new location reading outside the predetermined geographic area. When a new location reading is sampled by the location unit 306, the valid block 402 can operate the validation for that new reading.

The navigation system 100 can also decide to use invalid readings instead of disregarding them. For example, if the valid block 402 determines that the second location reading 216 is invalid, the second location reading 216 can be stored with an invalid sample block 414. If the invalid sample block 414 has met a predefined threshold 416 of invalid location readings, then the navigation system 100 can operate an error handling block 418.

For the purpose of any embodiment of the present invention, the predefined threshold 416 is defined as a limit on the number of invalid samples. For example, the predefined threshold 416 can consider factors as a predetermined count of invalid readings, a predetermined count of invalid readings per geographic area, the amount of error of the invalid reading, weather affecting the validity of location readings, or a combination thereof.

If the number of invalid samples is below the predefined threshold 416, the navigation system 100 will disregard a further invalid sample. If the number of invalid samples is beyond the predefined threshold 416, the navigation system 100 will operate a predetermined response, such as the operation in the error handling block 418. If the predefined threshold 416 of invalid location readings has not been reached, then the navigation system 100 can return to the valid block 402 to wait for a new location reading and operate the validation for the new location reading.

The error handling block 418 can operate the predetermined response to the invalid sample block 414 reaching the predefined threshold 416. For example, the error handling block 418 can initiate recalibration of the location unit 306 in the device 102, reboot the device 102, re-synch the device 102, or use a different location reading scheme. For example, different location reading schemes can include a global positioning system (GPS), cellular tower location, an accelerometer location system, or any combination thereof.

Figure 5:
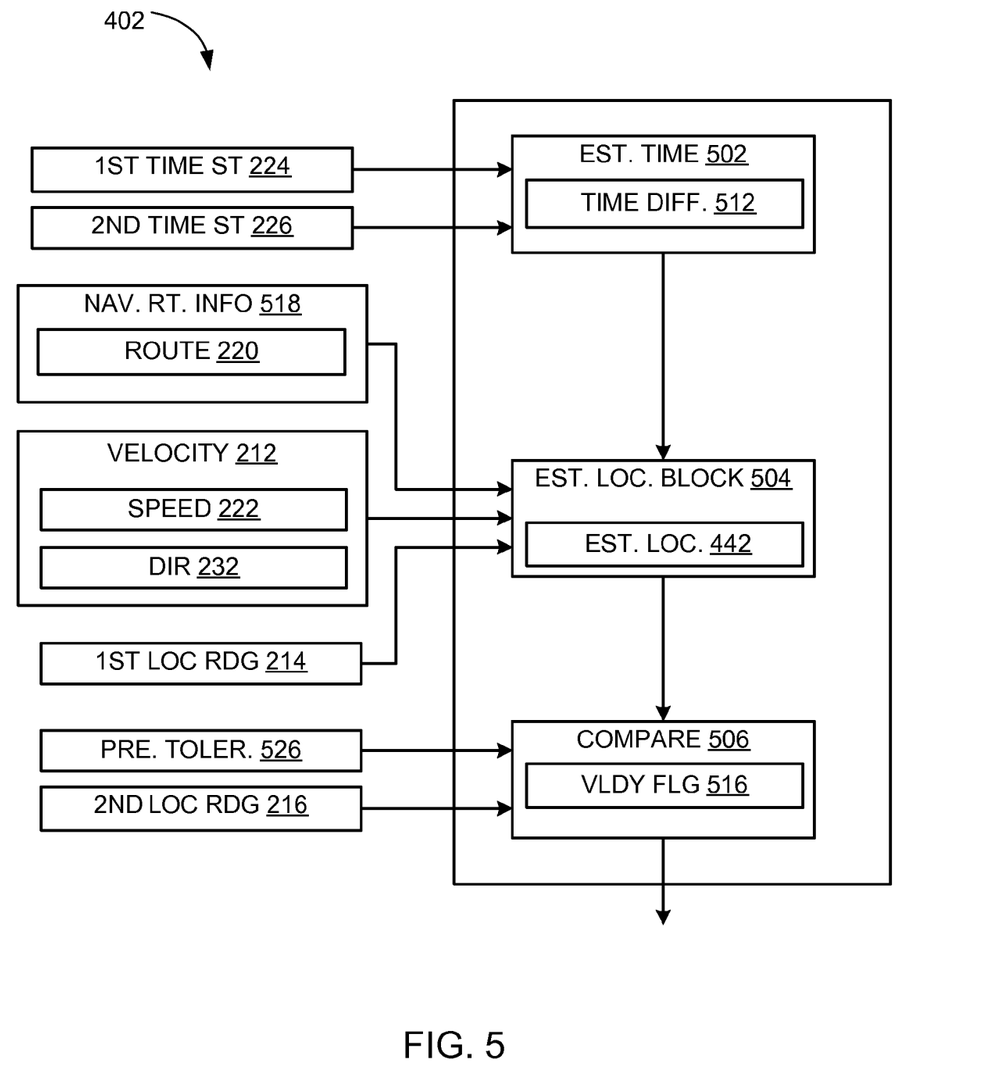
FIG. 5 is a flow chart for the valid block of FIG. 4.

Referring now to FIG. 5, therein is shown a flow chart for the valid block 402 of FIG. 4. The valid block 402 can receive information from the previous sample block 424 of FIG. 4, and receive information from the location unit 306 of FIG. 3. The valid block 402 can validate or invalidate the second location reading 216 of FIG. 2 in a number of ways.

For example, the valid block 402 can generate the estimated location 442 at the second time stamp 226 and can compare the estimated location 442 with the second location reading 216. Based on this comparison, the valid block 402 can determine whether the second location reading 216 is valid. The valid block 402 can perform the comparison in a number of ways.

For example, the valid block 402 can calculate a time difference 512 in an estimate time block 502. The estimate time block 502 can receive the first time stamp 224 from the previous sample block 424 and can receive the second time stamp 226 from the device 102. The estimate time block 502 can generate the time difference 512 between the first time stamp 224 and the second time stamp 226.

The valid block 402 can estimate the distance traveled by the device 102 in an estimate location block 504. The estimate location block 504 can receive the time difference 512 from the estimate time block 502, and can receive the first location reading 214 from the previous sample block 424 of FIG. 3. The estimate location block 504 can also receive the velocity 212 of the device 102 and the route 220 of FIG. 2 from navigation route information 518 to account for the curvatures and speed zones of the route 220.

The estimate location block 504 can compute the estimated location 442 by estimating the distance traveled from the first location reading 214 to the second location reading 216 by multiplying the speed 222 of the device 102 by the time difference 512. The estimated location 442 of the device 102 is the estimated distance traveled in the direction 232 along the route 220.

The estimated location 442 of the device 102 and the second location reading 216 can be compared in a compare location block 506. If the estimated location 442 and the second location reading 216 are equivalent or approximately the same to a predetermined tolerance 526, then the second location reading 216 is valid. The second location reading 216 as a valid location reading should be approximately equal to the third location reading 218 for the third location 208 within the predetermined tolerance 526.

For any embodiment of the present invention, the predetermined tolerance 526 can be used to compensate or account for variations, such as any curvature of the route 220, the velocity 212, and traffic fluctuations. The predetermined tolerance 526 can be set to provide a narrow range or very narrow tolerance, such as under a city block, for deviations, for example, in a crowded metropolitan area. The predetermined tolerance 526 can be set to provide a broad range, such as half a mile depending on the speed 222 of the device 102, for deviations, for example, in a sparse area along a highway between metropolitan areas.

If the estimated location 442 and the second location reading 216 are beyond the predetermined tolerance 526, then the second location reading 216 is not valid. The compare location block 506 can generate a validity flag 516, which can indicate whether the second location reading 216 is valid or invalid.

The valid block 402 of the navigation system 100 can filter errant location readings, such as the second location reading 216. Errant location readings which are not filtered can cause incorrect processes. For example, an errant location reading of the device 102 can be inside the navigation boundary 210, while the actual correct location of the device 102 is the third location reading 218, which is outside the navigation boundary 210.

The errant location reading can be identified as a traversal of the navigation boundary 210, and can therefore cause an incorrect process such as the business processes block 408 of FIG. 4. The valid block 402 of the navigation system 100 can be used to filter errant location readings such as the second location reading 216 to prevent operating processes caused by errant location readings.

The functions of the navigation system 100 can be implemented on the device 102. For example, the location unit 306 can provide the second location reading 216 which is the most recent location reading of the device 102 at the second time stamp 226. The software 360 of the device 102 can operate the valid block 402 to validate the second location reading 216.

If the valid block 402 decides the second location reading 216 is a valid location, then the valid block 402 can generate the validity flag 516. The software 360 can also generate information relevant to the second location reading 216 for display on the user interface 302 of FIG. 3 of the device 102.

The software 360 can also operate the navigation boundary traversal block 406 of FIG. 4 using the validity flag 516, the first location reading 214, and the second location reading 216 to determine whether the device 102 has traversed the navigation boundary 210 of FIG. 2. The device 102 can generate and display information on the user interface 302 depending on whether the navigation boundary traversal block 406 determines a traversal of the navigation boundary 210.

Figure 6:
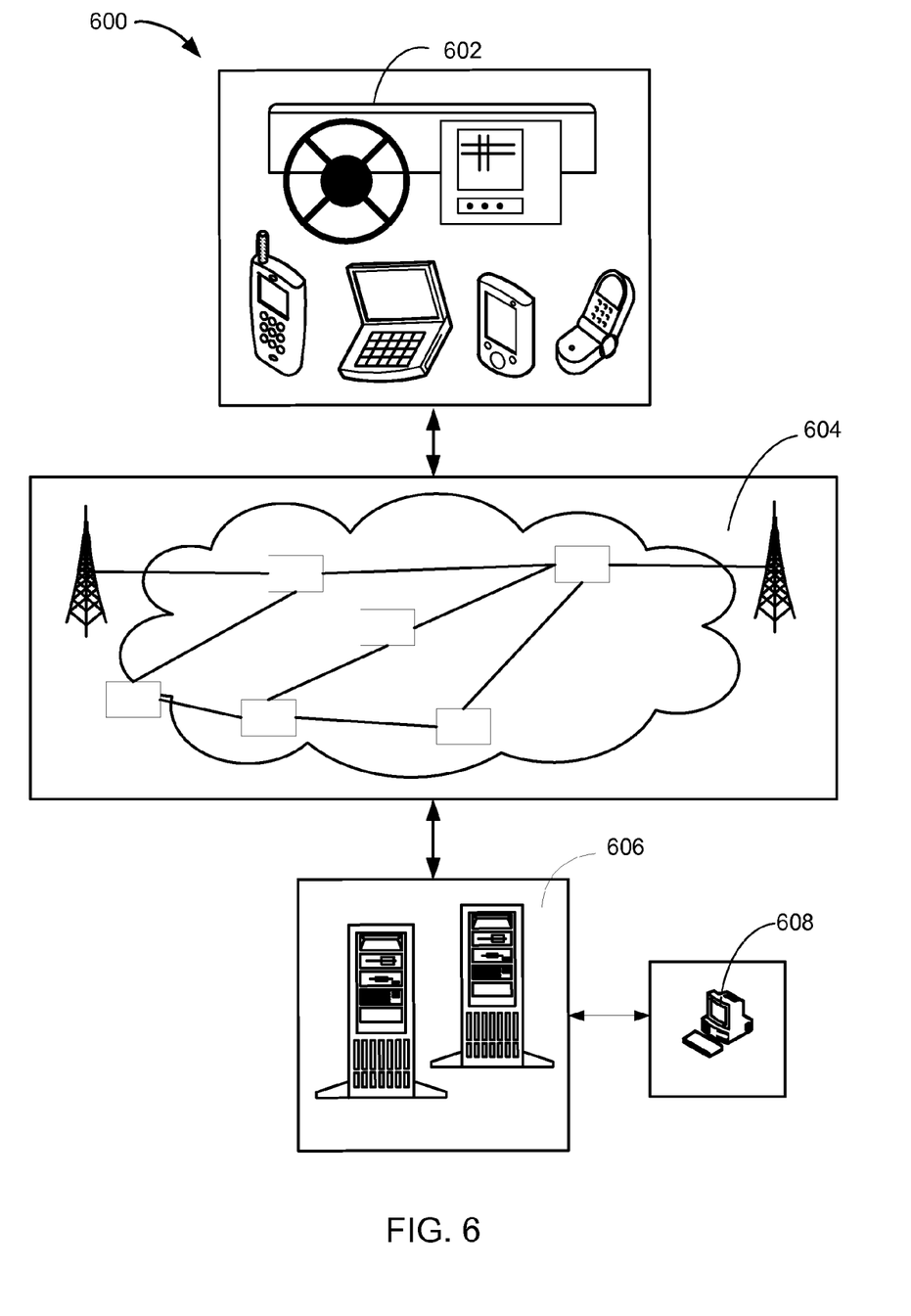
FIG. 6 illustrates a navigation system in a second embodiment of the present invention.

Referring now to FIG. 6, therein is shown a navigation system 600 in a second embodiment of the present invention. A first device 602, such as a client or a server, can connect to a communication path 604, such as a wireless network, a wired network, or a combination thereof. The communication path 604 can connect to a second device 606, such as a server or a client. A second user interface 608, such as an external terminal, can serve as an interface to the second device 606.

The first device 602 can be any of a variety of devices, such as a cellular phone, a personal digital assistant, a notebook computer, or an entertainment device. The first device 602 can be a standalone device, or can be incorporated with a vehicle, for example a car, truck, bus, train, or other. For example, the display of the first device 602 can be an in-dash display on the vehicle. The first device 602 can couple with the communication path 604 to communicate with the second device 606 and means for location monitoring of the first device 602.

The communication path 604 can be of any of a variety of networks. For example, the communication path 604 can include wireless communication, wired communication, optical, ultrasonic, or a combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 604. Ethernet, digital subscriber line (DSL), fiber to the home (FTTH), and plain old telephone service (POTS) are examples of wired communication that can be included in the communication path 604. Further, the communication path 604 can traverse a number of network topologies and distances. For example, the communication path 604 can include personal area network (PAN), local area network (LAN), metropolitan area network (MAN), and wide area network (WAN).

The second device 606 can be any of a variety of centralized or decentralized computing devices including a computer, grid computing resources, a virtualized computer resource, cloud computing resource, routers, switches, peer-to-peer distributed computing devices, or a combination thereof, having means to couple with the communication path 604 to communicate with the first device 602. For example, the second device 606 can represent real or virtual servers in a single computer room, distributed across different rooms, distributed across different geographical locations, embedded within a network, or virtualized servers within one or more other computer systems including grid or cloud type computing resources.

Further for illustrative purposes, the navigation system 600 is shown with the second device 606 as a non-mobile computing device, although it is understood that the second device 606 can be different types of computing devices. For example, the second device 606 can also be a mobile computing device, such as notebook computer, another of the first device 602, or a different type of client device.

Yet further for illustrative purposes, the navigation system 600 is shown with the second device 606 and the first device 602 as end points of the communication path 604, although it is understood that the navigation system 600 can have a different partition between the first device 602, the second device 606, and the communication path 604. For example, the first device 602, the second device 606, or a combination thereof can also function as part of the communication path 604. Also for illustrative purposes, the second device 606 and the second user interface 608 are shown as separate and discrete components, although it is understood that the second user interface 608 can be included in the second device 606.

Figure 7:
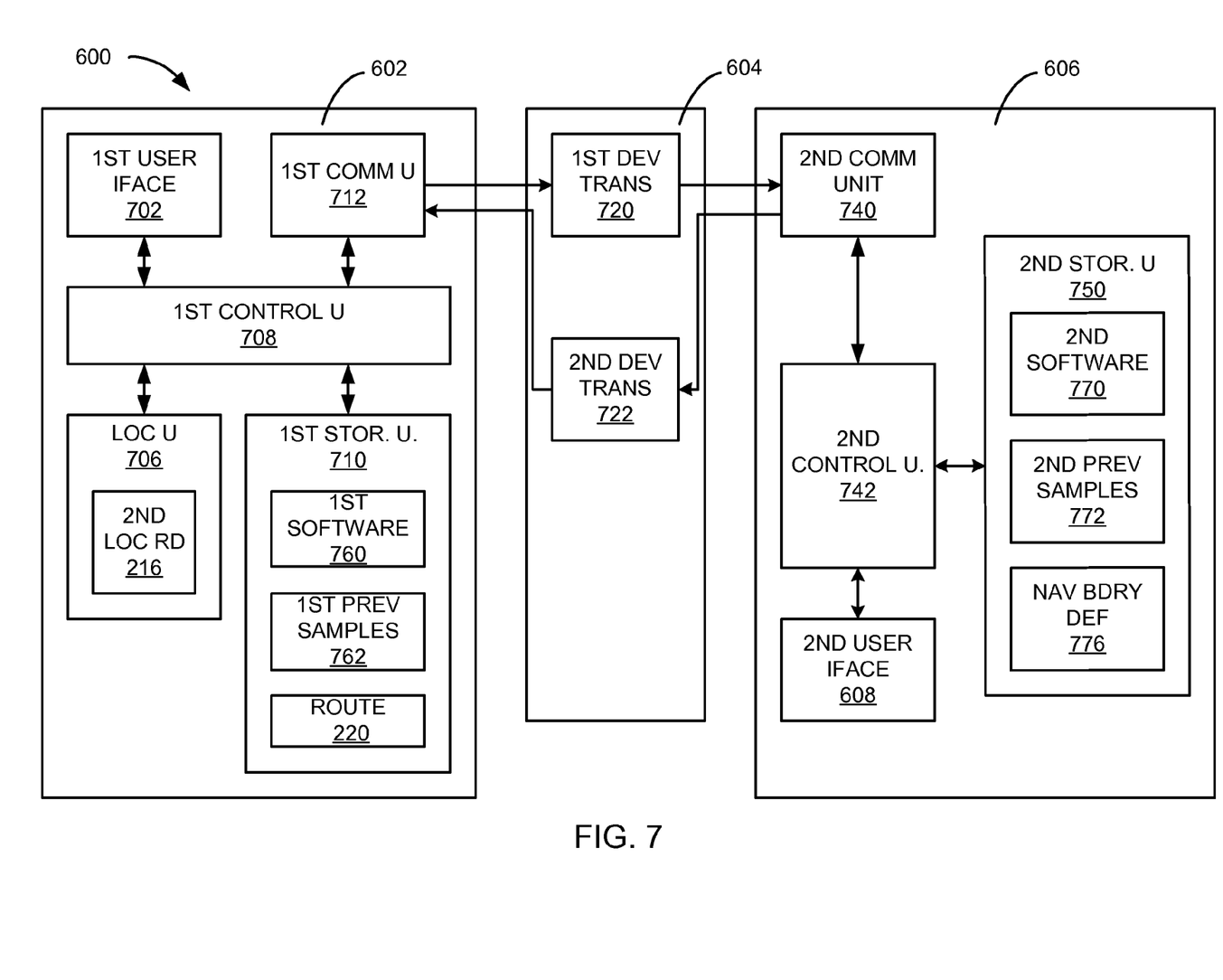
FIG. 7 is a block diagram of the navigation system of FIG. 6.

Referring now to FIG. 7, therein is shown a block diagram of the navigation system 600 of FIG. 6. The first device 602 can communicate with the second device 606 over the communication path 604. The first device 602, such as a client, can send information in a first device transmission 720 over the communication path 604 to the second device 606. The second device 606, such as a server, can send a second device transmission 722 over the communication path 604 to the first device 602.

For illustrative purposes, the navigation system 600 is shown with the first device 602 as a client, although it is understood that the navigation system 600 can have the first device 602 as a different type of device. For example, the first device 602 can be a server.

Also for illustrative purposes, the navigation system 600 is shown with the second device 606 as a server, although it is understood that the navigation system 600 can have the second device 606 as a different type of device. For example, a second device 106 can be a client.

The first device 602 can include, for example, a first control unit 708, such as a processor, a first storage unit 710, a first communication unit 712, a location unit 706, and a first user interface 702. For illustrative purposes, the navigation system 600 is shown with the first device 602 described with discrete functional blocks, although it is understood that the navigation system 600 can have the first device 602 in a different configuration. For example, the first control unit 708, the first communication unit 712, the first user interface 702 may not be discrete functional blocks, but may have one or more of the aforementioned blocks combined into one functional block.

The first control unit 708 can execute first software 760 and provide the intelligence of the device 102. The first control unit 708 can operate the first user interface 702 to display information generated by the navigation system 600. The first control unit 708 can also execute the first software 760 for the other functions of the navigation system 600, including receiving location information from the location unit 706. The first control unit 708 can obtain the velocity 212 of FIG. 2 based on the first location reading 214 of FIG. 2, the first time stamp 224 of FIG. 2, the second location reading 216 of FIG. 2, and the second time stamp 226 of FIG. 2.

The first storage unit 710 can be implemented in a number of ways. For example, the first storage unit 710 can be a volatile memory, a nonvolatile memory, an internal memory, an external memory.

The first storage unit 710 can include the first software 760 of the first device 602, first previous samples 762, and the route 220 of FIG. 2. The first previous samples 762 can include a location history of the first device 602. For example, the first previous samples 762 can include location readings and associated time stamps of the first device 602 sampled by the location unit 706 of the first device 602. The first previous samples 762 can be used by the navigation system 600 to validate a most recent location reading of the first device 602.

The first storage unit 710 can also include navigation information, for example, the route 220 with routing information and turn guidance. An example of the route 220 is shown in FIG. 2. The route 220 can be used by the navigation system 600 to validate a current location reading from the location unit 706. The route 220 can be generated by the first device 602 or the second device 606 and received by the first device 602 in the second device transmission 722 from the second device 606.

The first user interface 702 can include an output device and an input device. For example, the output device can include a projector, a video screen, a speaker, or any combination thereof. Examples of the input device are a key pad, a touchpad, soft-keys, a keyboard, a microphone, or any combination thereof to provide data and command inputs.

The location unit 706 of the first device 602 can generate a current location of the first device 602 as the second location reading 216 of FIG. 2. The location unit 706 can be implemented in many ways. For example, the location unit 706 can be a global positioning system (GPS), inertial navigation system, cell-tower location system, accelerometer location system, or any combination thereof.

The first communication unit 712 can include active and passive components, such as microelectronics or an antenna, for interaction with the communication path 604. The first control unit 708 can execute the first software 760 and can provide the intelligence of the first device 602 for interaction with the second device 606, the first user interface 702, the communication path 604 via the first communication unit 712, and interaction to the location unit 706.

The second device 606 can include, for example, a second control unit 742, such as a processor or computer, a second storage unit 750 with a second software 770, a second communication unit 740, and the second user interface 608 of FIG. 6. For illustrative purposes, the navigation system 600 is shown with the second device 606 described with discrete functional blocks, although it is understood that the navigation system 600 can have the second device 606 in a different configuration. For example, the second control unit 742, the second communication unit 740, and the second user interface 608 may not be discrete functional blocks, but may have one or more of the aforementioned blocks combined into one functional block.

The second storage unit 750 can include the second software 770 of the second device 606, second previous samples 772, and navigation boundary definitions 776. For illustrative purposes, the second storage unit 750 is shown as a single element, although it is understood that the second storage unit 750 can be a distribution of storage elements.

Also for illustrative purposes, the navigation system 600 is shown with the second storage unit 750 as a single hierarchy storage system, although it is understood that the navigation system 600 can have the second storage unit 750 in a different configuration. For example, the second storage unit 750 can be formed with different storage technologies forming a memory hierarchal system including different levels of caching, main memory, rotating media, or off-line storage.

The second previous samples 772 can include a history of the previous locations of the first device 602 or other devices (not shown). For example, the second previous samples 772 can include location readings of the first device 602 taken by the location unit 706 of the first device 602.

The second previous samples 772 can be used to supplement the first previous samples 762. For example, the second previous samples 772 can contain older location readings of the first device 602 and other devices, while the first previous samples 762 can contain more recent location readings of the first device 602.

The second storage unit 750 can also include the navigation boundary definitions 776, for example the navigation boundary 210 of FIG. 2. The navigation system 600 can determine a traversal of the navigation boundary 210 or other defined boundaries of the navigation boundary definitions 776.

The second control unit 742 can execute the second software 770 and provide the intelligence of the second device 606 for interaction with the first device 602, the second user interface 608 and the communication path 604 via the second communication unit 740. The first communication unit 712 can couple with the communication path 604 to send information to the second device 606 in the first device transmission 720. The second device 606 can receive the first device transmission 720 from the communication path 604 in the second communication unit 740.

The second communication unit 740 can couple with the communication path 604 to send information to the first device 602 in the second device transmission 722. The first device 602 can receive the second device transmission 722 from the communication path 604 in the first communication unit 712.

Figure 8:
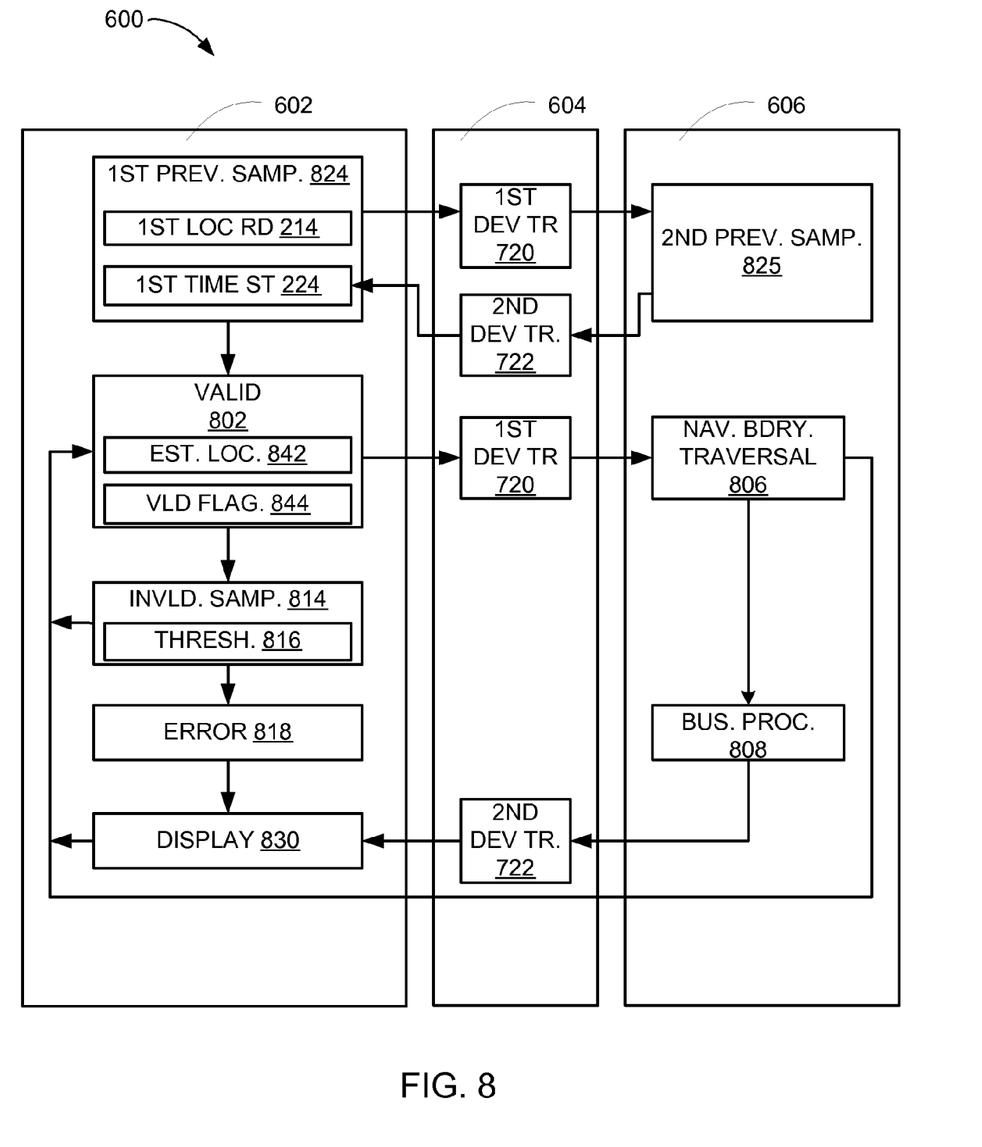
FIG. 8 is a flow chart of the navigation system of FIG. 6.

Referring now to FIG. 8, therein is shown a flow chart of the navigation system 600 of FIG. 6. The navigation system 600 can filter errant location readings including validating a location reading, determining traversal of the navigation boundary 210 of FIG. 2 or a combination thereof. As an example to describe an example of the navigation system 600, the first device 602 can represent the device 102 of FIG. 2. The flow chart of the navigation system 600 can be executed in the first control unit 708 of FIG. 7, the second control unit 742 of FIG. 7, or a combination thereof.

The first previous samples 762 of FIG. 7 can represent the previous locations of the first device 602. The navigation system 600 can include the first previous samples 762 in a first previous sample block 824. For example, the first previous sample block 824 can receive location readings and their associated time stamps from the first previous samples 762. For example, the first previous sample block 824 can include the first location reading 214 of FIG. 3 and the first time stamp 224 of FIG. 3.

The first previous samples 762 can be supplemented by the second previous samples 772 of FIG. 7. For example, the second device 606 can use the second previous samples 772 if the first storage unit 710 does not have space to store the previous samples used by the navigation system 600. The second storage unit 750 can provide additional storage capacity to the first storage unit 710 of FIG. 7. A second previous sample block 825 in the second device 606 can operate on the second previous samples 772 and can send information to the first device 602 in the second device transmission 722.

For illustrative purposes, the navigation system 600 depicts the first previous sample block 824 in the first device 602 and the second previous sample block 825 in the second device 606, although it is understood that the navigation system 600 can include a different partition for the previous samples. For example, the navigation system 600 can have the first previous sample block 824 or the second previous sample block 825 as optional.

A valid block 802 of the first device 602 can validate a most recent location reading and associated time stamp. The valid block 802 can receive the first location reading 214 and the first time stamp 224 from the first previous sample block 824. The valid block 802 can also receive the second location reading 216 of FIG. 2 and the second time stamp 226 of FIG. 2 from the location unit 706 of FIG. 7. The valid block 802 can validate or invalidate the second location reading 216 in a number of ways.

For example, the valid block 802 can compare the second location reading 216, representing the most recent location reading, with an estimated location 842, and decide whether the second location reading 216 is valid. The valid block 802 can calculate the estimated location 842 using the first time stamp 224, and the first location reading 214 from the first previous sample block 824 and the velocity 212 of FIG. 2 of the first device 602.

If the valid block 802 determines that the second location reading 216 is valid, the first device 602 can generate the first device transmission 720 with the first location reading 214 of FIG. 2, the second location reading 216 and a validity flag 844. The first device 602 can send the first device transmission 720 across the communication path 604 of FIG. 7 to the second device 606. The second location reading 216 can also be added to the first previous samples 762 for validation of later location readings. If the first storage unit 710 cannot store the first location reading 214, the first time stamp 224, the second location reading 216, the second time stamp 226, or a combination thereof, the aforementioned information can be stored at the second storage unit 750.

The second communication unit 740 can receive the first device transmission 720 from the communication path 604 in a navigation boundary traversal block 806 of the second device 606. The navigation boundary traversal block 806 can determine whether the first device 602 has traversed the navigation boundary 210.

The first location reading 214 and the second location reading 216 can be received by the navigation boundary traversal block 806. The navigation boundary traversal block 806 can also receive or contain one or more navigation boundaries, such as the navigation boundary 210 of FIG. 2, from the navigation boundary definitions 776 in the second storage unit 750 of FIG. 7. The navigation boundary traversal block 806 can decide from the first location reading 214 and the second location reading 216 whether the first device 602 has crossed any navigation boundaries.

If the navigation boundary traversal block 806 determines that the first device 602 has crossed the navigation boundary 210, then the navigation system 600 can operate a business processes block 808. The business processes block 808 can generate the second device transmission 722 with advertisements, coupons, predetermined billing routines, or alerts. The second device transmission 722 can be sent to the first device 602 across the communication path 604.

The second device transmission 722 can be received by the first device 602 in a display block 830 of the first device 602. The display block 830 can display the information of the second device transmission 722 on a display element of the first user interface 702 of FIG. 7.

If the navigation boundary traversal block 806 determines a traversal of the navigation boundary 210 has not occurred, then the navigation boundary traversal block 806 returns to the valid block 802 of the first device 602 and waits for a new current location reading from the location unit 706.

If the valid block 802 of the first device 602 determines that the second location reading 216 is invalid, the navigation system 600 can decide to disregard or ignore the second location reading 216. For example, a geographic area might have a high rate of invalid location readings for other devices. For the purpose of any embodiment of the present invention, a high rate of invalid location readings means that navigation devices in a geographic area can have a higher rate of invalid location readings than in other geographic areas. For example, geographic features of an area such as mountains can interfere with the accuracy of location readings.

The first previous sample block 824, the second previous sample block 825, or a combination thereof can provide this persistent errant location reading flag or designation, or it may be provided by another block or function. For example, the valid block 802 can read the location history of other devices from the first previous sample block 824, the second previous sample block 825, or a combination thereof, or receive alerts from other devices (not shown) about the errant readings.

The valid block 802 can use the location history or the alerts to decide whether to disregard location readings in a predetermined geographic area prone to errant readings, and wait for a new location reading outside the predetermined geographic area. When a new location reading is sampled by the location unit 706, the valid block 802 can operate the validation for that new reading.

The navigation system 600 can also decide to use invalid readings instead of disregarding them. For example, if the valid block 802 determines that the second location reading 216 is invalid, the second location reading 216 can be stored with an invalid sample block 814. If the invalid sample block 814 has met a predefined threshold 816 of invalid location readings, then the navigation system 600 can operate an error handling block 818.

For the purpose of any embodiment of the present invention, the predefined threshold 816 is defined as a limit on the number of invalid samples. For example, the predefined threshold 816 can consider factors as a predetermined count of invalid readings, a predetermined count of invalid readings per geographic area, the amount of error of the invalid reading, weather affecting the validity of location readings, or a combination thereof.

If the number of invalid samples is below the predefined threshold 816, the navigation system 600 will disregard a further invalid sample. If the number of invalid samples is beyond the predefined threshold 816, the navigation system 600 will operate a predetermined response, such as the operation in the error handling block 818 in the first device 602. If the number of invalid samples is not beyond the predefined threshold 816, then the navigation system 600 can return to the valid block 802 to wait for a new location reading and operate the valid block 802 with the new location reading.

The error handling block 818 can operate the predetermined response to the invalid sample block 814 reaching the predefined threshold 816 of invalid location readings. For example, the error handling block 818 can initiate recalibration of the location unit 706, reboot the first device 602, re-synch the first device 602, or use a different location reading scheme. For example, different location reading schemes can include a global positioning system (GPS), cellular tower location, an accelerometer location system, or any combination thereof.

The error handling block 818 can also send information to the display block 830 of the first device 602. The display block 830 can display the information on the first user interface 702, such as the type of the predetermined response initiated by the error handling block 818.

Figure 9:
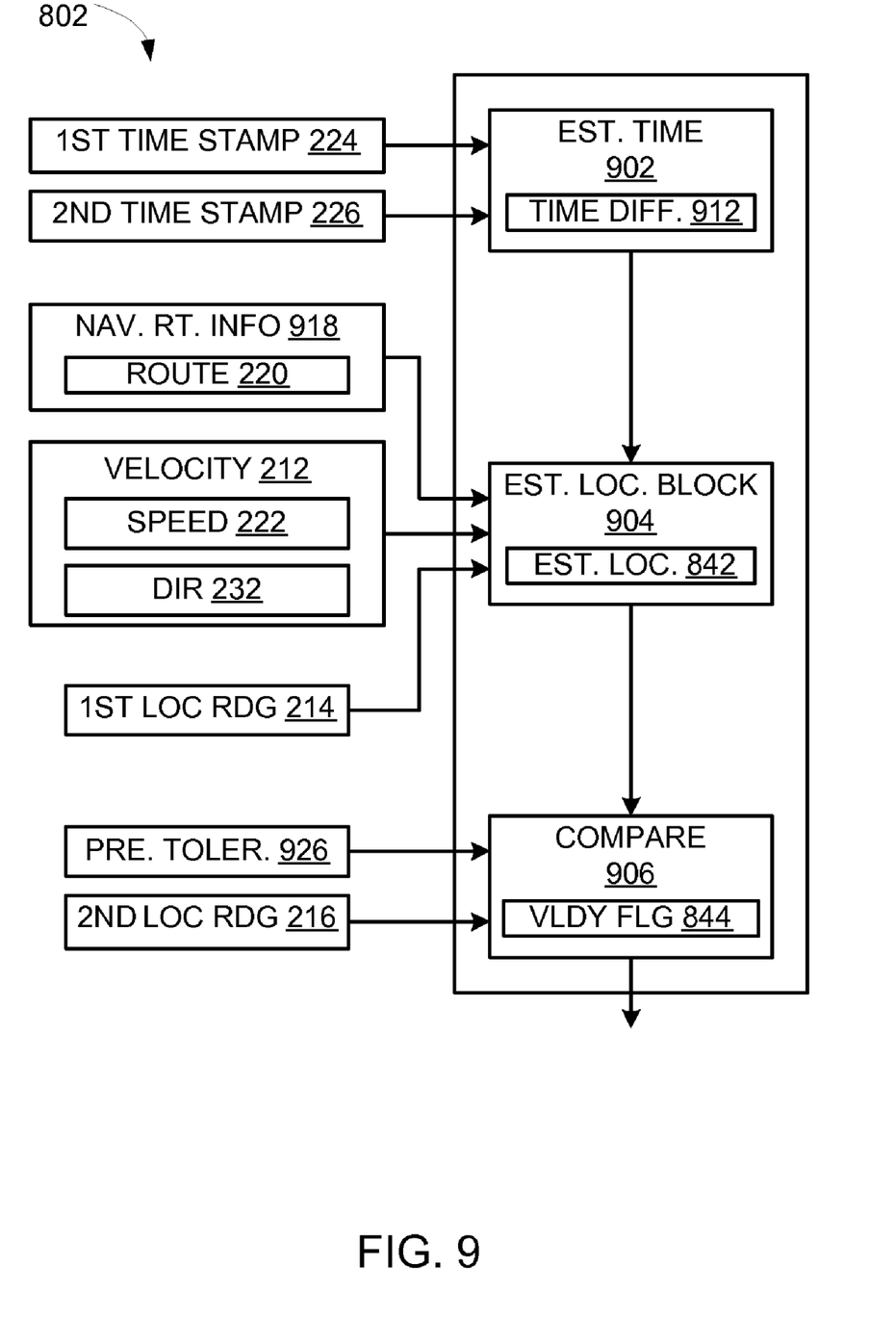
FIG. 9 is a flow chart for the valid block of FIG. 8.

Referring now to FIG. 9, therein is shown a flow chart for the valid block 802 of FIG. 8. The valid block 802 includes functionalities of the valid block 402 of FIG. 4 of the first embodiment of the invention.

The valid block 802 of the first device 602 can receive information from the first previous sample block 824 of FIG. 8, the second previous sample block 825 of FIG. 8, or a combination thereof and can receive information from the location unit 706 of the first device 602 of FIG. 7. The valid block 802 can validate or invalidate the second location reading 216 of FIG. 2 in a number of ways.

For example, the valid block 802 can generate the estimated location 842 of the first device 602 at the second time stamp 226 of FIG. 2 and can compare the estimated location 842 with the second location reading 216. Based on this comparison, the valid block 802 can determine whether the second location reading 216 is valid. The valid block 802 can perform the comparison in a number of ways.

For example, the valid block 802 can calculate a time difference 912 in an estimate time block 902. The estimate time block 902 can generate the time difference 912 between the first time stamp 224 and the second time stamp 226.

The valid block 802 can estimate the distance traveled by the first device 602 in an estimate location block 904. The estimate location block 904 can receive the time difference 912 from the estimate time block 902, and can receive the first location reading 214 from the first previous sample block 824 or the second previous sample block 825 of FIG. 8, or a combination thereof. The estimate location block 904 can also receive the velocity 212 of the first device 602, and the route 220 of FIG. 2 from navigation route information 918 to account for the curvatures and speed zones of the route 220.

The estimate location block 904 can compute the estimated location 842 of FIG. 8 by estimating the distance traveled from the first location reading 214 to the second location reading 216 by multiplying the speed 222 of the first device 602 by the time difference 912. The estimated location 842 of the first device 602 is the estimated distance traveled in the direction 232 along the route 220.

The estimated location 842 of the first device 602 and the second location reading 216 can be compared in a compare location block 906. If the estimated location 842 and the second location reading 216 are equivalent or approximately the same to a predetermined tolerance 926, then the second location reading 216 is valid. The second location reading 216 as a valid location reading should be approximately equal to the third location reading 218 for the third location 208 within the predetermined tolerance 926.

For any embodiment of the present invention, the predetermined tolerance 926 can be used to compensate or account for variations, such as any curvature of the route 220, the velocity 212, and traffic fluctuations. The predetermined tolerance 926 can be set to provide a narrow range or very narrow tolerance, such as under a city block, for deviations, for example, in a crowded metropolitan area. The predetermined tolerance 926 can be set to provide a broad range, such as half a mile depending on the speed 222 of the first device 602, for deviations, for example, in a sparse area along a highway between metropolitan areas.

If the estimated location 842 and the second location reading 216 are beyond the predetermined tolerance 926, then the second location reading 216 is not valid. The compare location block 906 can generate the validity flag 844, which can indicate whether the second location reading 216 is valid or invalid.

The valid block 802 of the navigation system 600 can filter errant location readings, such as the second location reading 216. Errant location readings which are not filtered can cause incorrect processes. For example, an errant location reading of the first device 602 can be inside the navigation boundary 210, while the actual correct location of the first device 602 is the third location reading 218, which is outside the navigation boundary 210.

The errant location reading can be identified as a traversal of the navigation boundary 210, and can therefore cause an incorrect process such as the business processes block 808 of FIG. 8. The valid block 802 of the navigation system 600 can be used to filter errant location readings such as the second location reading 216 to prevent operating processes caused by errant location readings.

The functions of the navigation system 600 can be implemented on the second device 606 of FIG. 7. The location unit 706 of the first device 602 can provide the second location reading 216 which is the most recent location reading of the first device 602 at the second time stamp 226. The first device 602 can send the second location reading 216 and the second time stamp 226 across the communication path 604 of FIG. 7 to the second device 606.

The second software 770 of the second device 606 can operate the valid block 802 to validate the second location reading 216. If the valid block 802 decides the second location reading 216 is a valid location, then the valid block 802 generates the validity flag 844. The second software 770 can also generate information relevant to the second location reading 216. The second device 606 can send the information across the communication path 604 to the first device 602 for display on the first user interface 702.

The second software 770 can also operate the navigation boundary traversal block 806 using the validity flag 844 and the second location reading 216 to determine whether the first device 602 has traversed the navigation boundary 210. The second device 606 can generate information depending on whether the navigation boundary traversal block 806 determines a navigation boundary traversal or otherwise. The second device 606 can send the information across the communication path 604 to the first device 602 for display on the first user interface 702 of the first device 602.

Figure 10:
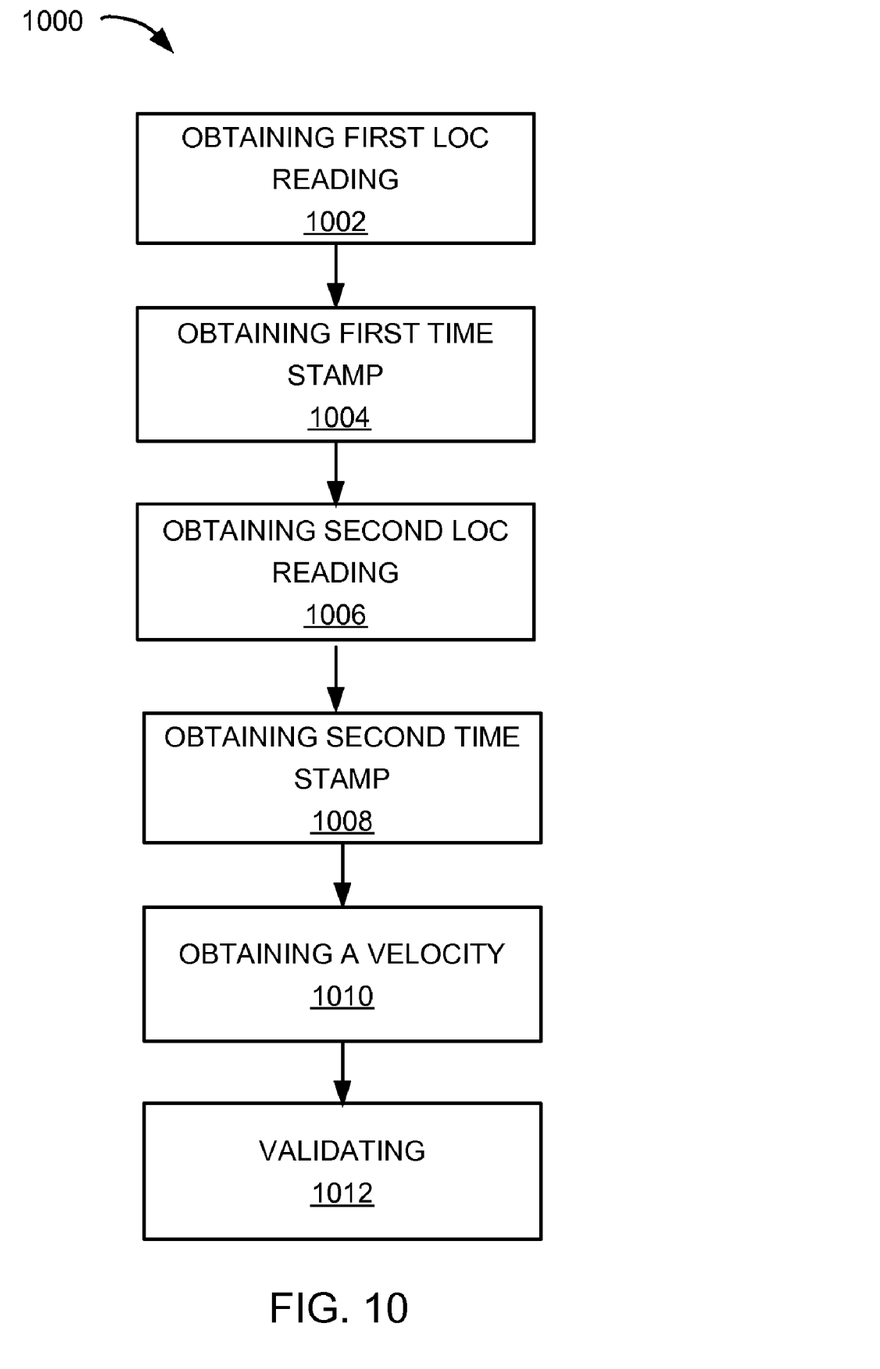
FIG. 10 is a flow chart of a method of operation of a navigation system in a further embodiment of the present invention.

Referring now to FIG. 10, therein is shown a flow chart of a method 1000 of operation of a navigation system 100 in a further embodiment of the present invention. The method 1000 includes sampling a first location reading from a device in a block 1002; sampling a first time stamp associated with the first location reading in a block 1004; sampling a second location reading from the device in a block 1006; sampling a second time stamp associated with the second location reading in a block 1008; obtaining a velocity for the device between the first location reading and the second location reading in a block 1010; and validating the second location reading with the first location reading, the first time stamp, the second time stamp, and the velocity for displaying on the device in a block 1012.

Yet another important aspect of the present invention is that it valuably supports and services the historical trend of reducing costs, simplifying systems, and increasing performance. These and other valuable aspects of the present invention consequently further the state of the technology to at least the next level.

Thus, it has been discovered that the navigation system of the present invention furnishes important and heretofore unknown and unavailable solutions, capabilities, and functional aspects for improving performance, increasing reliability, increasing safety and reducing cost of using a mobile client having location based services capability. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations can be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    sampling a first location reading for locating a device;
    sampling a second location reading for locating the device;
    calculating an estimated location based on a velocity of the first location reading;
    validating the second location reading based on comparing the second location reading to the estimated location;
    storing invalid samples based on the second location reading found invalid; and
    operating a predetermined response based on the invalid samples exceeding a predefined threshold for displaying on the device.

2. The method as claimed in claim 1 wherein:
    validating the second location includes:
        calculating a time difference between a second time stamp and a first time stamp; and
    calculating the estimated location includes:
        calculating the estimated location based on the time difference and the velocity; and
        comparing the estimated location and the second location reading.

3. The method as claimed in claim 1 wherein:
    validating the second location reading includes generating a validity flag as invalid; further comprising:
        determining the validity flag as invalid crossed the predefined threshold; and
        executing an error handling block based on the validity flag crossing the predefined threshold.

4. The method as claimed in claim 1 wherein validating the second location reading includes ignoring the second location reading based on a previous sample.

5. The method as claimed in claim 1 wherein:
    validating the second location reading includes generating a validity flag as valid; and further comprising:
        determining a traversal of a navigation boundary based on the first location reading and the second location reading as valid.

6. The method as claimed in claim 1 wherein calculating the estimated location based on the velocity includes sampling a speed and a direction for the device.

7. The method as claimed in claim 1 wherein validating the second location reading includes:
    processing navigation route information having a curvature; and
    accounting for the curvature.

8. The method as claimed in claim 1 wherein validating the second location reading includes:
    processing navigation route information having speed zones; and
    accounting for the speed zones.

9. The method as claimed in claim 1 wherein:
    validating the second location reading includes generating a validity flag as invalid; and
    further comprising:
        storing a previous sample having the second location reading.

10. The method as claimed in claim 1 wherein:
    validating the second location reading includes generating a validity flag as invalid; and
    further comprising:
        preventing an inadvertent determination of a traversal of a navigation boundary.

11. A navigation system comprising:
    a location unit for:
        sampling a first location reading from a device,
        sampling a second location reading from the device, and
    a control unit, coupled to the location unit, for:
        calculating an estimated location based on a velocity of the first location reading, validating the second location reading based on comparing the second location reading to the estimated location, storing invalid samples based on the second location reading found invalid, and operating a predetermined response based on the invalid samples exceeding a predefined threshold for displaying on the device.

12. The system as claimed in claim 11 wherein the control unit is for:

calculating a time difference between a second time stamp and a first time stamp;

calculating the estimated location based on the time difference and the velocity; and comparing the estimated location and the second location reading.

13. The system as claimed in claim 11 wherein the control unit is for:

generating a validity flag as invalid;

determining the validity flag as invalid crossed the predefined threshold; and executing an error handling block based on the validity flag crossing the predefined threshold.

14. The system as claimed in claim 11 wherein the control unit is for ignoring the second location reading based on a previous sample.

15. The system as claimed in claim 11 wherein the control unit is for:

generating a validity flag as valid; and determining a traversal of a navigation boundary based on the first location reading and the second location reading as valid.

16. The system as claimed in claim 11 wherein the control unit is for sampling a speed and a direction for the device.

17. The system as claimed in claim 11 wherein the control unit is for:

processing navigation route information having a curvature; and accounting for the curvature.

18. The system as claimed in claim 11 wherein the control unit is for:

processing navigation route information having speed zones; and accounting for the speed zones.

19. The system as claimed in claim 11 wherein the control unit is for:

generating a validity flag as invalid; and storing a previous sample having the second location reading.

20. The system as claimed in claim 11 wherein the control unit is for:

generating a validity flag as invalid; and preventing an inadvertent determination of a traversal of a navigation boundary.

* * * * *